(12) United States Patent
Cunanan et al.

(10) Patent No.: US 12,728,998 B2
(45) Date of Patent: Sep. 8, 2026

(54) AIRCRAFT GALLEY FITTING ASSEMBLY

(71) Applicant: B/E Aerospace, Inc., Winston Salem, NC (US)

(72) Inventors: Jeriel Binas Cunanan, Cabuyao (PH); Kevin Hedwhig Panaligan Generoso, Padre Garcia City (PH)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 18/991,962

(22) Filed: Dec. 23, 2024

(65) Prior Publication Data

US 2025/0223040 A1 Jul. 10, 2025

(30) Foreign Application Priority Data

Jan. 9, 2024 (EP) .................................... 24150982

(51) Int. Cl.
*B64D 11/04* (2006.01)
*B64C 1/40* (2006.01)

(52) U.S. Cl.
CPC ................ *B64D 11/04* (2013.01); *B64C 1/40* (2013.01)

(58) Field of Classification Search
CPC ................................. B64D 11/04; B64C 1/40
See application file for complete search history.

(56) References Cited

U.S. PATENT DOCUMENTS

| | | | | |
|---|---|---|---|---|
| 5,222,694 | A | 6/1993 | Smoot | |
| 9,291,190 | B2 | 3/2016 | Kammerer | |
| 2014/0008144 | A1* | 1/2014 | Savian | B64C 1/066 181/290 |
| 2018/0016010 | A1 | 1/2018 | Benthien et al. | |
| 2024/0262066 | A1* | 8/2024 | Winkler | B32B 7/12 |

FOREIGN PATENT DOCUMENTS

| | | | |
|---|---|---|---|
| CN | 115535207 | 12/2022 | |
| EP | 3112257 | 1/2017 | |
| JP | 2001122052 | 5/2001 | |
| JP | 2012122236 | 6/2012 | |
| JP | 2012122236 A * | 6/2012 | E04B 1/82 |
| WO | 2014035241 | 3/2014 | |

OTHER PUBLICATIONS

European Patent Office, European Search Report dated Jun. 12, 2024 in Application No. 24150982.7.

* cited by examiner

*Primary Examiner* — Timothy D Collins
*Assistant Examiner* — Terri L Filosi
(74) *Attorney, Agent, or Firm* — SNELL & WILMER L.L.P.

(57) ABSTRACT

An aircraft galley fitting assembly for attaching an aircraft galley structure to an aircraft structure, the fitting assembly comprising: a fitting panel arranged to be fixed to the aircraft structure and the aircraft galley structure; and a damping panel configured to be located between the fitting panel and the aircraft galley structure when assembled, wherein the damping panel comprises a plurality of convex protrusions extending from a first side of the damping panel.

17 Claims, 5 Drawing Sheets

AIRCRAFT GALLEY FITTING ASSEMBLY

CROSS-REFERENCE TO RELATED APPLICATIONS

This application claims priority to EP Patent Application No. 24150982.7, filed Jan. 9, 2024 and titled "AIRCRAFT GALLEY FITTING ASSEMBLY," which is incorporated by reference herein in its entirety for all purposes.

FIELD

The present invention relates to an aircraft galley fitting assembly, more specifically a fitting assembly comprising a damping panel. The invention also extends to an aircraft galley including the aircraft galley fitting assembly and a method of attaching an aircraft galley to an aircraft structure.

BACKGROUND

Aircraft galley frames play a crucial role in supporting and securing various components within the galley area, including ovens, carts, and other equipment essential for in-flight services. The invention disclosed herein focuses on mitigating and preventing damage caused by vibrations to these critical structural elements.

Aircraft galleys include a plurality of fittings for attaching the structure of the aircraft galley to the aircraft frame to keep the aircraft galley in position.

Aircraft are subject to various forces during operation, and vibrations are a common occurrence, especially during takeoff, landing, and turbulent conditions. These vibrations can adversely affect the structural elements of an aircraft, leading to fatigue, cracks, and other forms of damage. As the aircraft galley frame is fitted to the aircraft structure, it experiences the same vibrations as the aircraft structure and is therefore particularly susceptible to these detrimental effects.

Moreover, numerous components may be connected to elements of the galley structure, such as pipes or hoses for transporting waste water. These hoses are particularly vulnerable to the detrimental effects of the aircraft vibrations as they are subjected to repeated shear stresses during operation, which can lead to them shearing entirely. This can result in the wastewater being deposited in the galley itself, and flood the galley area, rather than be transported to a designated waste collection unit.

The above negative effects lead to increased maintenance requirements, and in many cases may require the aircraft to be out of service while necessary repairs are carried out.

Existing solutions to address vibration-related damage in aircraft structures often involve complex and expensive reinforcement methods to both the aircraft galley structure or the waste water hoses, which may add weight to the aircraft and compromise fuel efficiency.

There is, therefore, a need for an innovative and efficient solution to protect aircraft galley structure from the damaging effects of vibrations, ensuring the structural integrity of the galley components and enhancing overall safety and reliability.

SUMMARY

Viewed from a first aspect, there is provided an aircraft galley fitting assembly for attaching an aircraft galley structure to an aircraft structure, the fitting assembly comprising: a fitting panel arranged to be fixed to the aircraft structure and the aircraft galley structure; and a damping panel configured to be located between the fitting panel and the aircraft galley structure when assembled, wherein the damping panel comprises a plurality of convex protrusions extending from a first side of the damping panel.

The damping panel may be configured to reduce vibrations experienced in the aircraft structure being experienced by the aircraft galley structure.

One or more of the convex protrusions of the plurality of convex protrusions may comprise a conical shape.

The conical shape may be a flat-topped conical shape.

The conical shape may be a rounded conical shape.

Each of the plurality of convex protrusions may comprise the same shape.

The shape of each convex protrusion of the plurality of convex protrusions may vary across the first side of the damping panel.

Each of the plurality of convex protrusions may be spaced apart in a regular manner such that the distance between each convex protrusion may be equal across first side of the damping panel.

The distance between each convex protrusion may be arranged to allow for elastic expansion of each convex protrusion in a plane parallel to the first side of the damping panel when pressure is applied in a direction perpendicular to the first side of the damping panel.

The first side of the damping panel may be arranged to face the fitting panel such that the fitting panel may be configured to be in contact with each of the plurality of convex protrusions.

The plurality of convex protrusions may be a first plurality of convex protrusions, and the damping panel may further comprise a second plurality of convex protrusions extending from a second side of the damping panel, wherein the second side may be arranged to face the aircraft galley structure.

The damping panel may comprise one or more through-holes configured to align with one or more through-holes in the fitting panel to allow the fitting panel and the damping panel to be fixed to the aircraft structure using one or more fixings.

Viewed from a second aspect, there is provided an aircraft galley comprising: a plurality of aircraft galley structures; and at least one aircraft galley fitting assembly as described in the first aspect configured to attach one or more of the plurality of aircraft galley structure to a portion of the aircraft structure.

The aircraft galley may comprise a plurality of aircraft galley fitting assemblies, wherein each aircraft galley fitting assembly may attach each respective aircraft galley section to a portion of the aircraft structure.

Viewed from a third aspect, there is provided a method of attaching an aircraft galley structure to a portion of an aircraft structure; the method comprising: providing a fitting panel to attach the aircraft structure and the aircraft galley structure; and providing a damping panel between the fitting panel and the aircraft galley structure, wherein the damping panel comprises a plurality of convex protrusions extending from a first side of the damping panel.

BRIEF DESCRIPTION OF THE DRAWINGS

Certain embodiments of the invention will now be described, by way of example only, with reference to the accompanying drawings, in which.

DETAILED DESCRIPTION

Figure 1A:
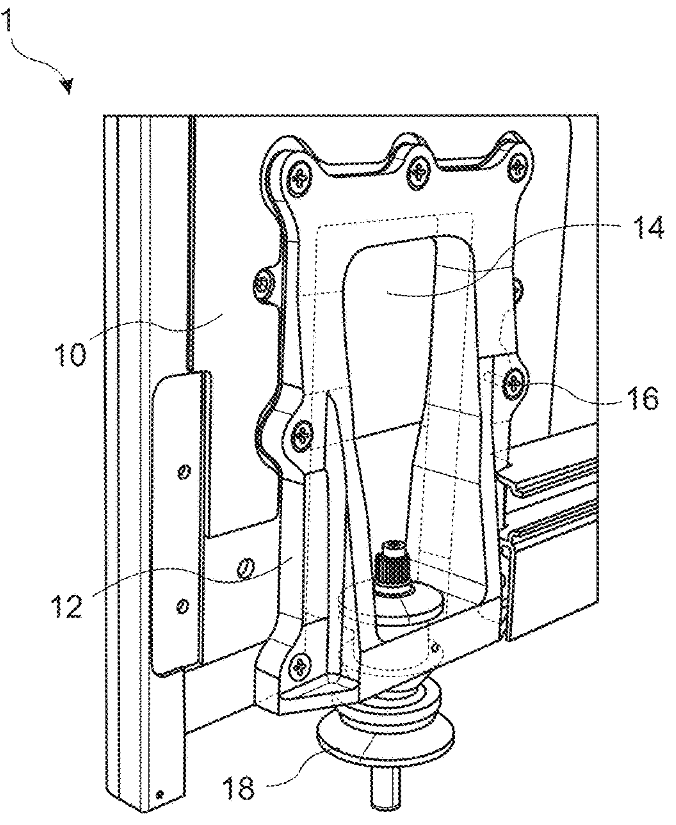
FIGS. 1A and 1B show two perspective viewpoints of an aircraft galley fitting assembly.

Viewed from a first aspect, there is provided an aircraft galley fitting assembly for attaching an aircraft galley structure to an aircraft structure, the fitting assembly comprising a fitting panel arranged to be fixed to the aircraft structure and the aircraft galley structure; and a damping panel configured to be located between the fitting panel and the aircraft galley structure when assembled, wherein the damping panel comprises a plurality of convex protrusions extending from a first side of the damping panel.

The presence of a damping panel between the fitting panel and the aircraft galley structure has the effect of reducing the vibrations experiences in the aircraft galley structure. In particular, any vibrations present within the aircraft structure caused by turbulence or any other cause, are reduced in the aircraft galley structure. This reduces the damaging effects of vibrations in the aircraft galley structure, such as a reduction in fatigue and cracking, as well as reducing the likelihood of damaging the waste water pipes. Accordingly, the above arrangements lead to an increased operating life-time of the aircraft galley structure and requires less ongoing maintenance, thereby improving the operating efficiency of the aircraft as a whole.

Moreover, the presence of the plurality of convex protrusions extending from the first side of the damping panel may further reduce the vibrations transferred from the aircraft structure to the aircraft galley structure.

Accordingly, as will be appreciated the damping panel may be configured to reduce vibrations experienced in the aircraft structure being experienced by the aircraft galley structure. In other words, any vibrations present in the aircraft structure may be reduced in the aircraft galley structure.

The plurality of convex protrusions may be distributed across the first side of the damping panel in the form of an array. The plurality of convex protrusions may therefore be termed an array of convex protrusions.

Each of the plurality of convex protrusions may be spaced apart in a regular manner such that the distance between each convex protrusion is equal across first side of the damping panel. In other words, the distance between each convex protrusion of the plurality of convex protrusions may be constant across the first side of the damping panel. As an alternative, the spacing between each convex protrusion of the plurality of convex protrusions may vary across the side of the damping panel. This may allow for higher concentrations of the plurality of convex protrusions at certain points on the first side of the damping panel, and lower concentrations at other points. This could be of particular benefit in cases where higher frequency or amplitudes of vibrations, or higher loads caused by the vibrations, are experienced at certain points across the fitting panel and aircraft galley structure.

It will be appreciated that due to the vibrations, a pressure or force may be applied to each of the plurality of convex protrusions. This pressure or force may be applied broadly in a direction which is perpendicular to the first side of the damping panel, i.e. perpendicular to a surface of the aircraft galley structure. In practice, said pressure or force may be comprised of a plurality of vectors due to the random nature of the vibrations. However, in general, the overall force or pressure may be applied in a perpendicular direction. The application of this pressure on the damping panel, which is positioned between the fitting panel and the aircraft galley structure, may cause each of the plurality of convex protrusions to be compressed in a direction which is perpendicular to the first side of the damping panel.

During the compression of the plurality of convex protrusions, the height of each convex protrusion may be reduced, and the width of each convex protrusion may therefore increase depending on the material properties of each of the plurality of convex protrusions. In other words, each of the convex protrusions may expand in a plane that is parallel to the first side of the damping panel.

Therefore, in a preferred arrangement, the distance between each convex protrusion may be arranged to allow for elastic expansion of each convex protrusion in a plane parallel to the first side of the damping panel when pressure is applied in a direction perpendicular to the first side of the damping panel. For example, the distance between each convex protrusion may be between 1 mm and 12 mm, optionally 5 mm. However, the precise distance may depend on the size of the damping panel as a whole, i.e. the thickness of the damping panel, and the size of each convex protrusion.

The fitting panel may comprise a central aperture configured to allow access to a stud for attaching the fitting panel to the aircraft structure. The fitting panel may accordingly comprise a frame, having the central aperture within the frame. The central aperture may be aligned with an aperture within the aircraft galley structure. The size and/or shape of the damping panel may be equal the size and/or shape of the fitting panel such that an entire surface of the fitting panel is in contact with the damping panel. Alternatively, the damping panel may be larger or smaller than the fitting panel.

The first side of the damping panel may be arranged to face the fitting panel such that the fitting panel is configured to be in contact with each of the plurality of convex protrusions. In more detail, when the fitting assembly is assembled, each of the plurality of convex protrusions may be in direct contact with the fitting panel. As such, any vibrations present in the fitting panel, which may be due to vibrations in the aircraft structure, may cause an oscillating force to be applied to each of the plurality of convex protrusions.

As an alternative, the first side of the damping panel may be arranged to face the aircraft galley structure such that the fitting panel is configured to be in contact with each of the plurality of convex protrusions.

Furthermore, the plurality of convex protrusions referred to above may be a first plurality of convex protrusions. The damping panel then may further comprise a second plurality of convex protrusions extending from a second side of the damping panel. Accordingly, the damping panel may comprise a plurality of convex protrusions on both sides of the damping panel. In the case where the first side of the damping panel is arranged to face the fitting panel, the second side of the damping panel may be arranged to face the aircraft galley structure. In the case, where the first side of the damping panel is arranged to face the aircraft galley structure, the second side of the damping panel may be arranged to face the fitting panel.

In the assembled configuration, the fitting panel may be in direct contact with the damping panel. Alternatively, one or more spacers may be provided depending on the precise size and shape of each of the fitting panel and damping panel such that the fitting panel may be in indirect contact with the damping panel.

Similarly, in the assembled configuration, the damping panel may be in direct contact with the aircraft galley structure. Alternatively, one or more spacers may be provided depending on the precise size and shape of each of the damping panel and the aircraft galley structure such that the fitting panel may be in indirect contact with the damping panel.

The convex protrusions may comprise a tapered shape formed of tapering sides which taper in a direction starting from the first and/or second side of the damping panel, and extend in a direction away from the panel. A central axis of the plurality of convex protrusions may extend in a direction which is perpendicular with the first side of the damping panel and in a direction away from the first side of the damping panel.

One or more of the convex protrusions may comprise a conical shape. In other words, one or more of the convex protrusions may comprise a tapered shape. More specifically, the conical shape may be a flat-topped conical shape or a rounded conical shape.

In either arrangement, one or more of the convex protrusions may comprise a circular configuration when viewed form an angle perpendicular to the first and/or second side of the damping panel.

The use of a convex shape, in particular a conical shape, provides improved vibration attenuation in the damping panel. In more detail, the arrangement on the damping panel having a plurality of convex protrusions may result in a number of angles through which the forces impacting the damping panel due to the vibrations in the aircraft structure can be dissipated.

A further advantageous effect of both types of conical shapes, but especially rounded conical shapes, may be the elimination or reduction of any edges or corners present in the convex protrusions. Sharp edges or corners may form pressure points when the plurality of convex protrusions are compressed which may increase the wear on the plurality of convex protrusions. By providing a conical shape, the edges present are reduced, which thus reduces or eliminates the presence of pressure points and therefore improves the life-time of the damping panel.

As an alternative, the convex protrusions may comprise a cylindrical shape. The cylindrical shape may be characterized in that it comprises straight sides which may extend in a direction which is perpendicular to the first/and/or second side of the damping panel.

Each convex protrusion of the plurality of first and/or second convex protrusion may comprise the same shape. In particular, all of both the first and second plurality of convex protrusions may comprise a conical shape, such as a flat-topped or rounded conical shape, or may comprise a cylindrical shape.

One alternative arrangement may be that the first plurality of convex protrusions may comprise a first shape, and the second plurality of convex protrusions may comprise a second shape, wherein the first shape may be a flat-topped conical shape and a second shape may be a rounded conical shape, or vice versa. Alternatively, a first shape may be a conical shape and the second shape may be a cylindrical shape, or vice versa.

Another possible arrangement may be where the shape of each convex protrusion of the first plurality of convex protrusions may vary across the first side of the damping panel. Similarly, the shape of each convex protrusion of the second plurality of convex protrusions may vary across the first side of the damping panel. As an example, the first plurality of convex protrusions may comprise a mixture of one or more flat-topped conical shapes, rounded conical shapes and cylindrical shapes. The same may apply for the second plurality of convex protrusions.

The maximum diameter of each of the plurality of convex protrusions may be between 1 mm and 12 mm. The height of each of the plurality of convex protrusions may be between 1 mm and 12 mm, optionally 5 mm. The maximum compression in use of each of the plurality of convex protrusions may be equivalent to 60% of the height of each convex protrusion.

The fitting panel may comprise one or more through-holes which may be arranged to align with one or more though-holes located in the aircraft galley structure. The one or more through-holes may be configured to receive one or more fixings for fixing the fitting panel relative to the aircraft galley structure.

The damping panel may comprise one or more through-holes which may be configured to align with the one or more through-holes in the fitting panel. This may allow the fitting panel and the damping panel to be fixed to the aircraft structure using the one or more fixings. When assembled, the fitting panel, damping panel and aircraft galley structure may therefore form a sandwich configuration, whereby the damping panel may be arranged between, and in direct contact with, the fitting panel and aircraft galley structure.

There may be no convex protrusions provided on the damping panel in the area proximate each of the one or more through-holes. In other words, a spacing may be provided around the periphery of each of the one or more through-holes in the damping panel. The spacing may be equivalent to the spacing between each of the plurality of convex protrusions. For example, the spacing about the periphery of each of the one or more through-holes may be between 1 mm and 12 mm, optionally 5 mm. The presence of this spacing may allow for a degree of elastic expansion of each of the plurality of convex protrusions in a direction parallel to the first side of the damping panel in use without impacting the one or more fixings located within the one or more through-holes.

The damping panel may be formed of any elastomeric material capable of absorbing and attenuating vibrations. For example, the damping panel may be formed of a rubber material, such as Buna-N rubber (i.e. Nitrile rubber). This particular material is of benefit during aerospace application due to its stability at a wide range of temperatures, as well as its resistance to chemicals.

The present invention has so far been discussed in relation to the fitting assembly for an aircraft galley structure. However, it will be appreciated that the present invention also extends to an aircraft galley as a whole, comprising the fitting assembly as discussed above.

Accordingly, when viewed from a second aspect, there is provided an aircraft galley comprising: a plurality of aircraft galley structures; and at least one aircraft galley fitting assembly of any preceding claims configured to attach one or more of the plurality of aircraft galley structure to a portion of the aircraft structure.

The aircraft galley may comprise a plurality of aircraft galley fitting assemblies, wherein each aircraft galley fitting assembly may be configured to attach a respective aircraft galley structure of the plurality of aircraft galley structures to a portion of the aircraft structure.

The portion of the aircraft structure may be a part of the aircraft structure proximate to the aircraft galley on the aircraft. The aircraft galley may be arranged to be connected directly to the aircraft structure via the aircraft galley fitting assembly, or indirectly via one or more intermediate components.

The aircraft galley fitting assembly of the second aspect may comprise any of the features discussed in relation to the first aspect above.

Viewed from a third aspect, there is also provided a method of attaching an aircraft galley structure to a portion of an aircraft structure; the method comprising: providing a fitting panel to attach the aircraft structure and the aircraft galley structure; and providing a damping panel between the fitting panel and the aircraft galley structure, wherein the damping panel comprises a plurality of convex protrusions extending from a first side of the damping panel.

The fitting panel, aircraft galley structure and damping panel may comprise any of the features discussed in relation to each of the respective features in the first or second aspect.

The method may further comprise a step of forming the damping panel. The damping panel may be formed using an injection molding process. In particular, the method may comprise a step of melting the material used to form the damping panel. For example, in the case where the damping material is formed of Buna-N material, the method may comprise melting the Buna-N material.

The method may then comprise injecting the material into a mold comprise a negative cavity having the shape of the damping panel, wherein the injection may be carried out at high pressure, and the mold may comprise a steel mold.

The method may then comprise allowing the material to solidify to form the damping panel, and may then comprise removing the damping material from the mold.

Figure 1B:
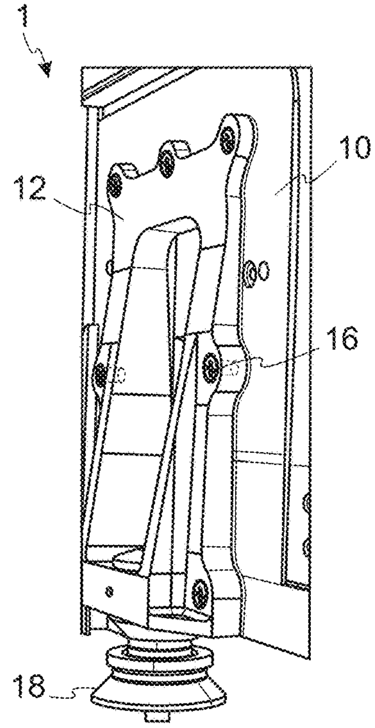

FIGS. 1A and 1B depict two perspective views of an aircraft galley fitting assembly 1. The aircraft galley comprises a frame structure which defines the various compartments used for housing the components of the aircraft galley. Specifically, there may be certain compartments for housing the various trolleys used to dispense food and beverages during the flight, compartments for housing food storage containers such as refrigerators, and compartments for preparing food such as ovens.

It is necessary for the frame structure of the aircraft galley to be attached to the structure of the aircraft itself. In most cases, the aircraft galley frame structure is attached to a floor surface, which in turn is fixed to the airframe of the aircraft, either directly or indirectly. The aircraft galley structure is fixed to the floor surface using the aircraft galley fitting assembly 1 shown in FIGS. 1A and 1B.

The aircraft galley fitting assembly 1 includes a fitting panel 12 which is fixed to a floor surface of the aircraft (not shown) using a stud 18 and to a section of the aircraft galley structure 10 using a plurality of screws 16. The screws 16 are inserted through respective through-holes located about the perimeter of the fitting panel 12.

The fitting panel 12 comprises a central aperture 14 which is aligned with an aperture within the aircraft galley structure 10 to provide access to the stud 16 for fixing the fitting panel 12 to the floor surface (not shown).

During operation, aircraft structures experience vibrations caused during take-off and landing, as well as during turbulent conditions. Due to the nature in which the aircraft galley structure is fixed to the aircraft structure, any vibration felt by the aircraft structure can be equally felt by the aircraft galley structure.

Over time this can result in damage to the components of the aircraft galley fatigue, cracks, and other forms of damage. Moreover, it is common for aircraft galleys to be provided with waste water pipes which are connected to both the aircraft galley structure and the aircraft structure, and are comprised of elastic material. In operation, the repeated vibrations can result in constant shear stresses being experienced by the waste water pipes which can result in the pipe shearing entirely and flood the aircraft galley.

Figure 2:
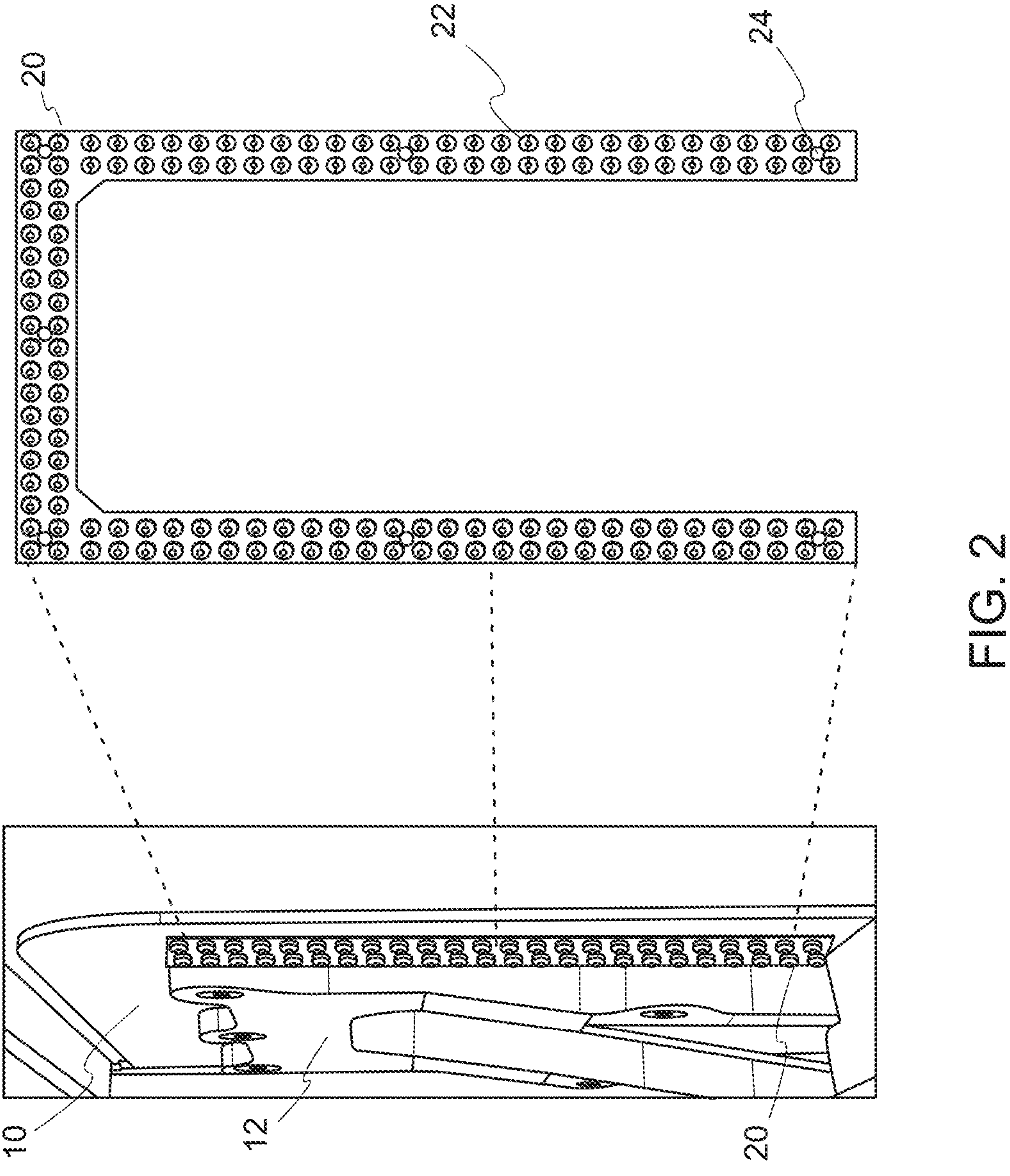
FIG. 2 shows a partially exploded view of an aircraft galley fitting assembly.

In order to address this issue, the aircraft galley fitting assembly is provided with a damping panel 20 which is shown in FIG. 2. FIG. 2 shows a partially exploded view of the aircraft galley fitting assembly 1 where a damping panel 20 is located between the fitting panel 12 and the aircraft galley structure 10.

The damping panel 20 is formed of high-end industrial elastic material, such as Buna-N rubber, sandwiched between the fitting panel 12 and the aircraft galley structure 10. In operation, the damping panel 20 acts to dampen the vibrations experienced by the aircraft galley 10 structure by absorbing any of the vibrations present in the aircraft structure.

The shape of the damping panel 20 matches the shape of the fitting panel 12. In particular, the damping panel 20 comprises a central aperture which aligns with the central aperture 14 of the fitting panel 12 so that access to the stud 18 is maintained. In this specific example of FIG. 2, the damping panel 20 is U-shaped when viewed form an angle perpendicular to the aircraft galley structure 10. The open side of the U-shaped damping panel 20 is provided at the lower side of the damping panel 12 so that access to the stud 18 is provided.

As stated above, the fitting panel 12 is fixed to the aircraft galley structure 10 using fixings 16 via through-holes located in the outer perimeter of the fitting panel 12. The damping panel 20 therefore also comprises through-holes (24) which are positioned at a point so that when the fitting assembly 1 is assembled, the through-holes 24 of the damping panel 20 are aligned with the through-holes on the fitting panel 12 for receiving the fixings 16 so that both the fitting panel 12 and the damping panel 20 can be fixed to the aircraft galley structure 10.

In the area of the damping panel 20 proximate to the through-holes, there may be no convex protrusions 22 to allow for the fixing 16 to be located therein. Effectively, a spacing may be provided about the perimeter of the through-holes, and this spacing may be equivalent to the spacing between the convex protrusions 22 elsewhere on the damping panel 22. In particular, the spacing between a perimeter of each through-holes and the nearest convex protrusion 22 may be between 1 mm to 10 mm, optionally 5 mm as in the specific example provided below. This allows for elastic expansion of the convex protrusions 22 as pressure is applied them, without impacting the fixings 16. However, in the present example, no significant spacing is provided about the through-holes 24 in the damping panel 20.

This acts to protect the aircraft galley structure 10 from the problems referred to above, namely fatigue and cracking due to the constant vibrations over time. Additionally, dampening the vibrations experienced by the aircraft galley structure reduce the chance of damaging the waste water pipes.

To further reduce the vibrations experienced by the aircraft galley structure 10, the damping panel 20 comprises a plurality of convex protrusions 22. The convex protrusions 22 extend from a first side of the damping panel 20, where the first side faces the fitting panel 12 when assembled. Although, as an alternative, the first side of the damping panel 20 may face the aircraft galley structure 10 when assembled. In addition, the damping panel 20 may also comprise a plurality of convex protrusions 22 on a second side of the damping panel 20 so that convex protrusions are provided on both sides of the damping panel 20.

Figure 3:
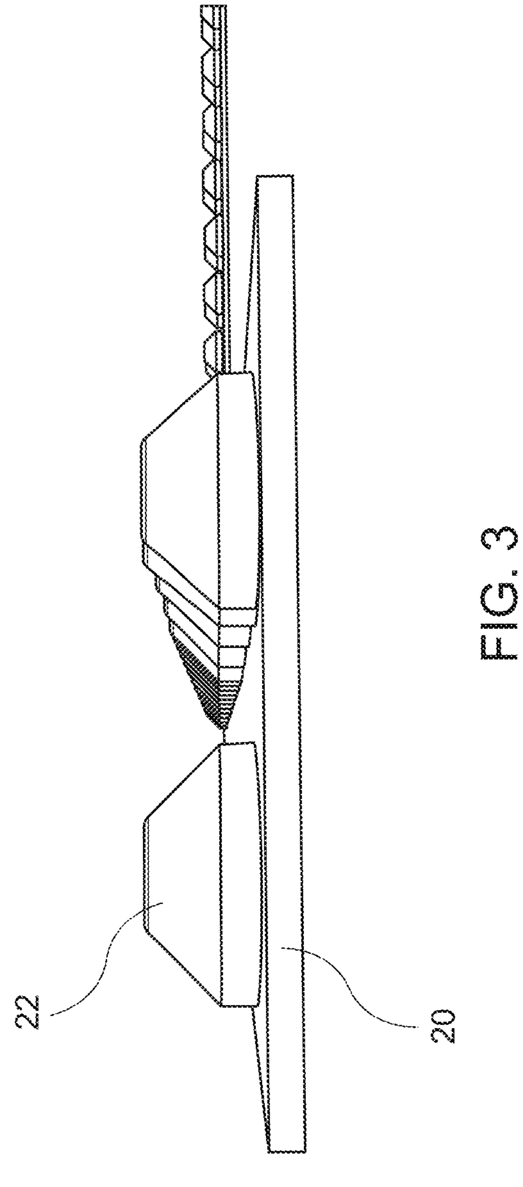
FIG. 3 shows a side view of a damping panel for an aircraft galley fitting assembly.

Each of the convex protrusions 22 comprise a flat-topped conical shape as shown in FIG. 3. The flat-topped conical protrusions 22 extend in a direction away from the damping panel 20, and are formed of the same material as the damping panel 20 as described above. In most cases, each of the plurality of convex protrusions 22 are integrally formed with the damping panel 20, i.e. the plurality of convex protrusions 22 are a part of the damping panel.

The damping panel 20 in the present example is formed using an injection molding process. In this process, the Buna-N material is melted to form a liquid which is injected at high pressure into a steel mold comprised of two separate halves forming the shape of the damping panel 20. After injection, the material cools and solidifies to form the damping panel 20.

This method of manufacture allows for the creation of complex geometries with consistent and accurate dimensions.

Figure 4:
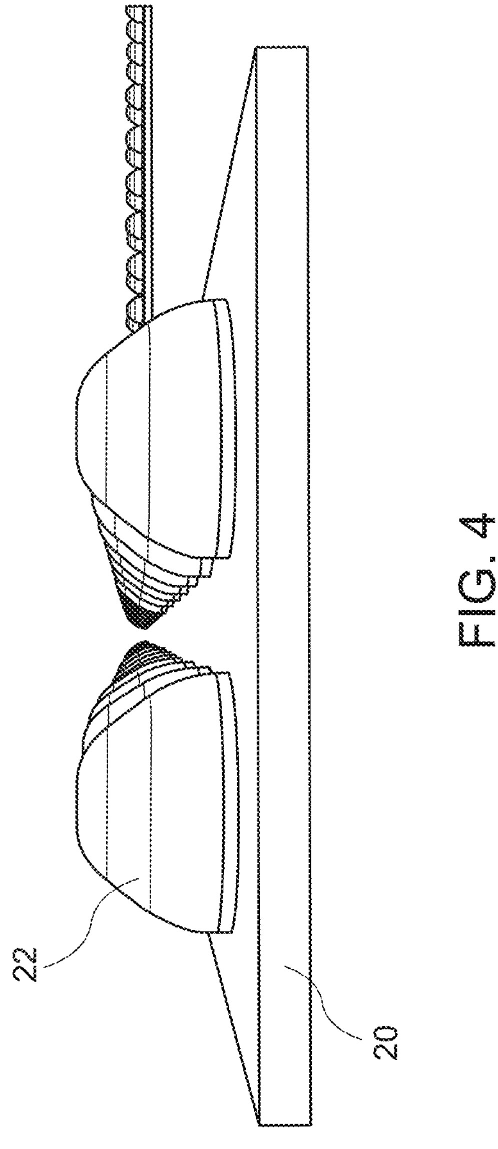
FIG. 4 shows a side view of a damping panel.

The flat-topped conical shape shown in FIG. 3 is merely one example, and any other convex shape may be applicable. For example, the convex protrusions 22 may comprise a rounded conical shape as depicted in FIG. 4. Both examples provided here comprise tapered sides, however, alternatively, the convex protrusions 22 may comprise a cylindrical shape whereby the sides of the protrusions 22 are straight.

A preferred feature, however, is for the convex protrusions 22 to comprise a circular shape when viewed from an angle that is perpendicular to the damping panel 20. The use of a circular shape has the advantage that it eliminates pressure points that would be present for shaped with corners, such as triangular or rectangular shapes, when the convex protrusion is compressed. This reduces the wear and tear on the convex protrusions 22 and extends the life of the damping panel 20 as a whole.

Figures 5A, 5B:
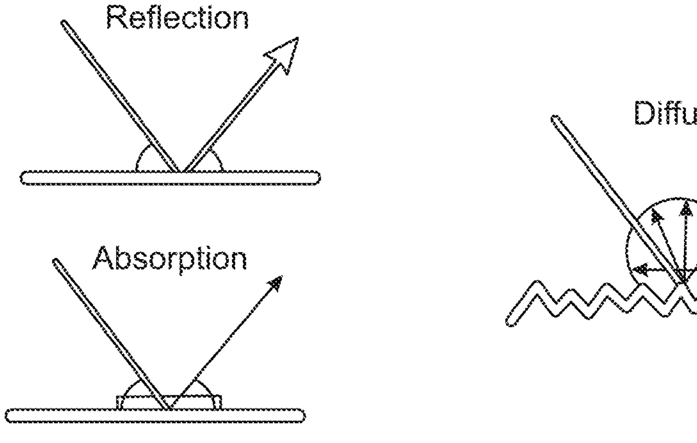
FIGS. 5A and 5B shows a comparison in the attention of forces due to vibrations.

FIGS. 5A and 5B depict the advantageous effect of providing damping panel 20. In particular, as shown in FIG. 5A, if the damping panel 20 was not present any forces felt due to the vibrations of the aircraft structure may be equally felt by the aircraft galley structure due to the impact of Newton's Third Law of Motion. By providing the damping panel 20 with the plurality of convex protrusions 22, any forces impacting the damping panel 20 are dissipated due to the angles present due to the convex protrusions 22 as depicted in FIG. 5A. This results in the vibration forces experienced by the aircraft galley structure 10 being reduced compared to the vibrations present in the aircraft structure.

The height of each of the convex protrusions in this example is 5 mm, but may be anywhere in the range of, but not limited to, 1 mm to 12 mm depending on the damping requirements and conditions that the aircraft galley fitting assembly 1 is designed to operate in. In use, the convex protrusions 22 may be compressed by up to 60% of their height due to the vibrations experienced in the aircraft structure, i.e. to a height that is 40% of their original height. As an example, if the convex protrusions 22 have a height of 1.4 mm, as in the example above, they may be compressed up to a height of 0.56 mm.

Each of the convex protrusions 22 are spaced across the surface of the damping panel 20 in a regular pattern. In other words, the spacing between each convex protrusion 22 is constant across the entire panel. The spacing between each convex protrusion 22 is sufficient to allow for elastic expansion of the convex protrusions 22 in the radial direction when pressure is applied to them by the fitting panel 12 and the aircraft galley structure 10. As will be appreciated, as pressure is applied to the top surface of the convex protrusions 22, their height will be reduced as discussed above, and their width will therefore increase by an amount so that the effective volume of each convex protrusion 22 remains constant.

The reference to the radial direction above is intended to apply the radial direction of the convex protrusions 22 when viewed from an angle that is perpendicular to the damping panel 22. In other words, the radial direction refers to a direction which is parallel with the damping panel 22.

In the present example, the spacing between each convex protrusion 22 is 5 mm, but it may be anywhere between 1 mm and 12 mm depending on the conditions it is expected to operate in.

Typically, the spacing would be constant across the entire damping panel 20 as discussed above, but in an alternative arrangement, the spacing between each convex protrusion 22 may vary across the damping panel 20. In more detail, at certain points on the damping panel 20, the spacing between each of the convex protrusions 22, may be different to the spacing between each convex protrusion 22 at other parts of the damping panel 20.

The spacing between the convex protrusions 22 may vary based on the pressure distribution across the damping panel 20. In particular, it may be realized through testing or modelling of the system that certain areas of the damping panel may experience a greater pressure than others, and therefore the compression of the convex protrusions 22 in certain areas of the damping panel 20 may be greater than in other areas of the damping panel 20. This would mean that the elastic expansion in the radial direction of each of the convex protrusions 22 may differ, and so the spacing can be adjusted accordingly.

What is claimed is:

1. An aircraft galley fitting assembly for attaching an aircraft galley structure to an aircraft structure, the fitting assembly comprising:

a fitting panel configured to be fixed to the aircraft structure and the aircraft galley structure, the fitting panel comprising one or more through-holes; and a damping panel configured to be located between the fitting panel and the aircraft galley structure when assembled, wherein the damping panel comprises a plurality of convex protrusions extending from a first side of the damping panel, wherein the damping panel comprises one or more through-holes configured to align with the one or more through-holes in the fitting panel to allow the fitting panel and the damping panel to be fixed to the aircraft structure using one or more fixings.

2. The aircraft galley fitting assembly of claim 1, wherein the damping panel is configured to reduce vibrations experienced in the aircraft structure being transferred from the aircraft structure to the aircraft galley structure.

3. The aircraft galley fitting assembly of claim 1, wherein one or more of the convex protrusions of the plurality of convex protrusions comprise a conical shape.

4. The aircraft galley fitting assembly of claim 3, wherein the conical shape is a flat-topped conical shape.

5. The aircraft galley fitting assembly of claim 3, wherein the conical shape is a rounded conical shape.

6. The aircraft galley fitting assembly of claim 3, wherein the shape of each convex protrusion of the plurality of convex protrusions varies across the first side of the damping panel.

7. The aircraft galley fitting assembly of claim 1, wherein each of the plurality of convex protrusions comprise the same shape.

8. The aircraft galley fitting assembly of claim 1, wherein each of the plurality of convex protrusions are spaced apart in a regular manner such that the distance between each convex protrusion is equal across the first side of the damping panel.

9. The aircraft galley fitting assembly of claim 8, wherein the distance between each convex protrusion is arranged to allow for elastic expansion of each convex protrusion in a plane parallel to the first side of the damping panel when pressure is applied in a direction perpendicular to the first side of the damping panel.

10. The aircraft galley fitting assembly of claim 1, wherein the first side of the damping panel is arranged to face the fitting panel such that the fitting panel is configured to be in contact with each of the plurality of convex protrusions.

11. The aircraft galley fitting assembly of claim 1, wherein the plurality of convex protrusions is a first plurality of convex protrusions, and the damping panel further comprises a second plurality of convex protrusions extending from a second side of the damping panel, wherein the second side is arranged to face the aircraft galley structures.

12. The aircraft galley fitting assembly of claim 1, wherein the plurality of convex protrusions are configured to be compressed in a direction perpendicular to the first side of the damping panel under a pressure applied to the plurality of convex protrusions due to the vibrations.

13. The aircraft galley fitting assembly of claim 1, wherein the damping panel is formed of an elastomeric material.

14. An aircraft galley comprising:

a plurality of aircraft galley structures; and an aircraft galley fitting assembly of claim 1 configured to attach one of the plurality of aircraft galley structure to a portion of the aircraft structure.

15. The aircraft galley of claim 14, comprising a plurality of aircraft galley fitting assemblies, wherein each aircraft galley fitting assembly attaches each respective aircraft galley section to a portion of the aircraft structure.

16. A method of attaching an aircraft galley structure to a portion of an aircraft structure; the method comprising:

providing a fitting panel to attach the aircraft structure and the aircraft galley structure, the fitting comprising one or more through-holes; and providing a damping panel between the fitting panel and the aircraft galley structure, wherein the damping panel comprises a plurality of convex protrusions extending from a first side of the damping panel, wherein the damping panel comprises one or more through-holes configured to align with the one or more through-holes in the fitting panel to allow the fitting panel and the damping panel to be fixed to the aircraft structure using one or more fixings.

17. The aircraft galley fitting assembly of claim 16, wherein the damping panel is configured to reduce vibrations experienced in the aircraft structure being transferred from the aircraft structure to the aircraft galley structure.

* * * * *